Patented Apr. 2, 1935

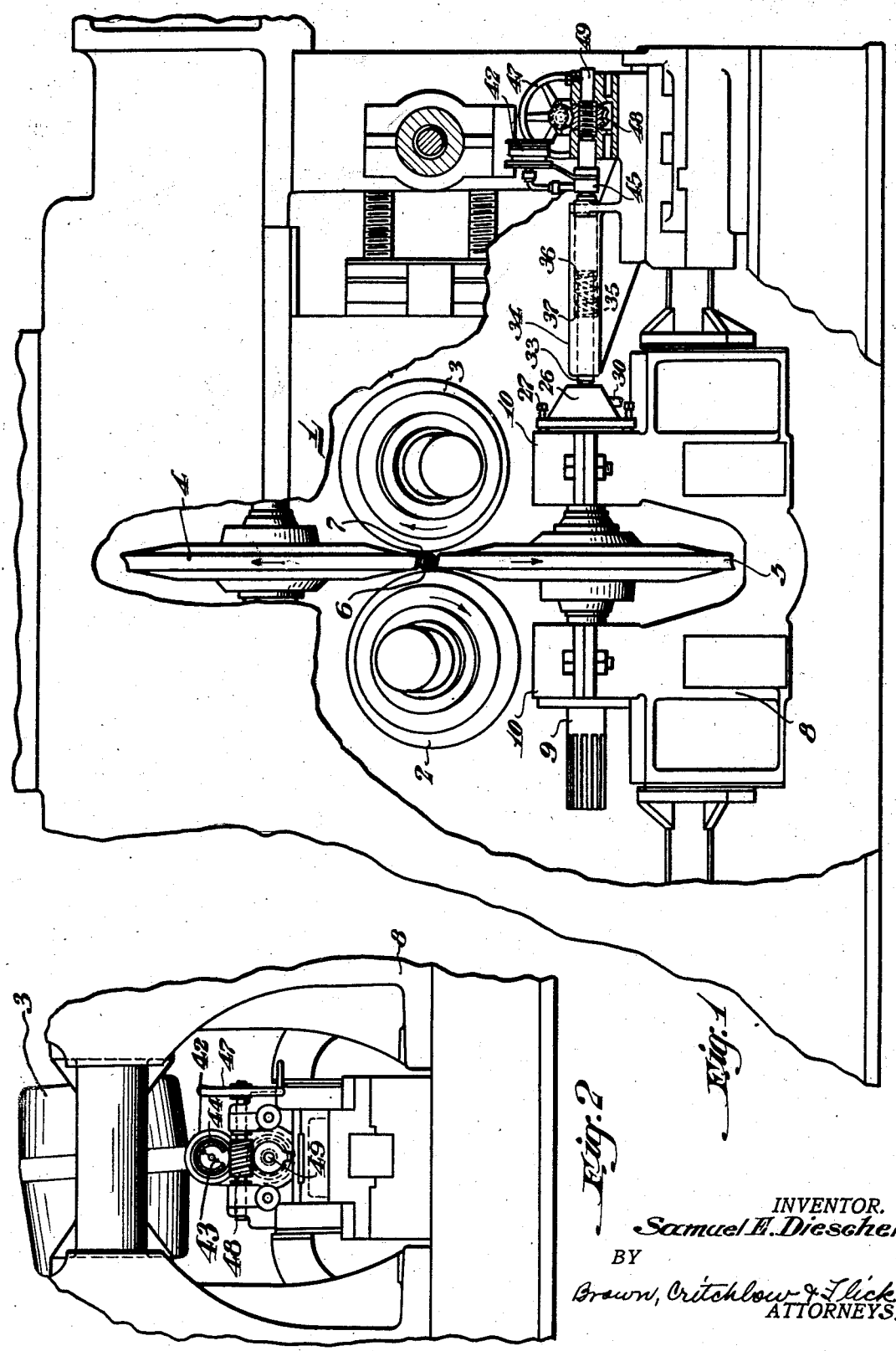

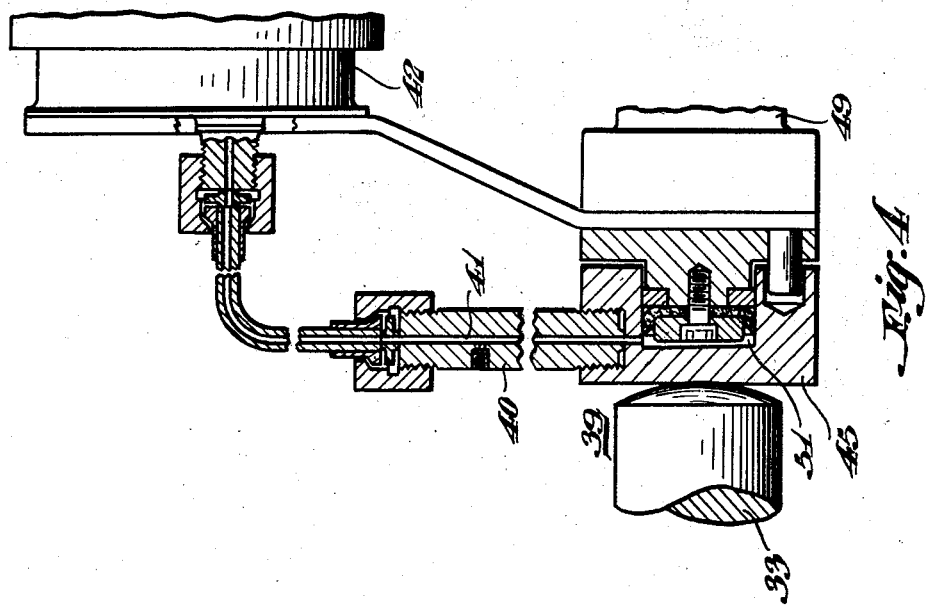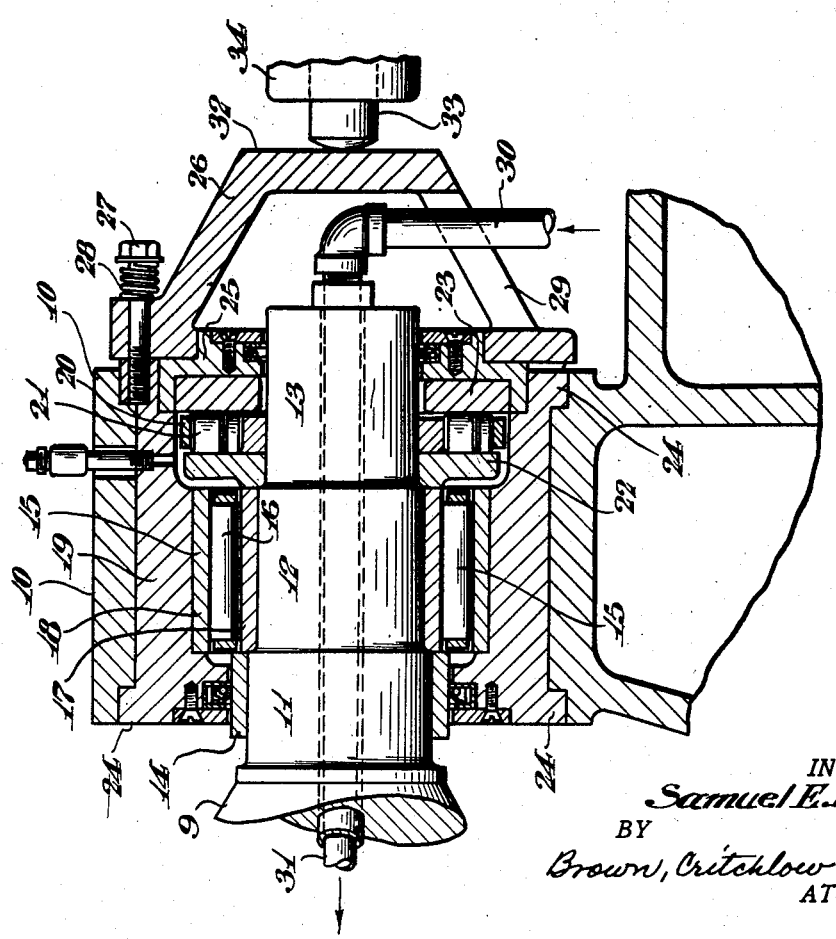

1,996,148

UNITED STATES PATENT OFFICE 1,996,148

THRUST INDICATOR FOR GUIDE DISKS

Samuel E. Diescher, Pittsburgh, Pa., assignor to Diescher Tube Mills, Inc., Pittsburgh, Pa., a corporation of Delaware Application October 19, 1933, Serial No. 694,254

9 Claims. (Cl. 80—13)

My invention relates to cross-roll apparatus, and more particularly to thrust-indicating apparatus for guide disks of cross-roll mills.

In the operation of cross-roll mills, such, for example, as those shown and described in my Patent No. 1,870,209, granted August 2, 1932, the bulging of the wall of the tube caused by the action of the cross rolls is limited by guide disks that are mounted on axes substantially perpendicular to the axis of the tubes passing between the guide disks and the cross rolls. These guide disks are preferably driven at a peripheral speed much higher than that of the longitudinal movement of the tubes.

The tubular blanks in passing through the cross rolls have a helical movement of relatively rapid rotation, but the longitudinal progression of the tubes is relatively slow. The guide disks rotate in planes substantially coinciding with the axis of longitudinal movement of the tubular blank and assist in the elongation of the latter by limiting the bulging of the blank and diverting longitudinally the flow of the metal and pulling the blank forward in the pass. The guide disks are driven at relatively high peripheral speeds for the further purpose of reducing transverse friction between the helically moving blanks and the engaging surfaces of the guide disks.

The transverse friction between the tubular blanks and the guide disks will vary under different conditions, such, for example, as the diameters and wall thickness of the tubes, the kind of metal of which the tubes are made, the amount of wall reduction effected by the cross rolls, the speed of the cross rolls, the angle of the helix of the movement of the tubes, the spacing of the guide disks and the speed of the guide disks. Inasmuch as changes in settings are frequently required to suit different sizes and wall thicknesses of product to be made, the operator is confronted with the task of estimating the speed of the guide disks at which the transverse friction is of such amount as to be most suitable for the operating conditions for the various sizes and characters of tubes.

The higher the speed at which the guide disks are driven the greater is the amount of power they consume and the friction that certain tubes are capable of withstanding may not be suitable for other tubes by reason of the thin walls of the latter. It is advisable therefore that the operator be in position to adjust the speed of the disks in order to secure the transverse friction that is mose desirable for any given set of operating conditions.

In order that the operator may be advised of the degree of transverse friction that obtains at any time, I provide means for measuring and indicating the thrust that is caused by such friction upon one of the oppositely mounted guide disks. By varying the speed of the guide disks and noting the indications of the corresponding thrusts the operator will be able to adjust the speed for the degree of friction that is most suitable for the conditions under which the mill is then operating.

The details of my invention will be described in connection with the accompanying drawings, in which Fig. 1 is a face view in elevation of a cross-roll mill equipped with the thrust measuring and indicating mechanism of my invention, parts being broken away; Fig. 2 is a view in elevation of a portion of the apparatus of Fig. 1 taken at right angles thereto and looking from the right of Fig. 1; Fig. 3 is an enlarged vertical longitudinal sectional view of the thrust bearings for the lower guide disk of Fig. 1 and of certain parts asociated with the bearing; and Fig. 4 is an enlarged vertical sectional view of a portion of the indicating mechanism of Figs. 1 and 2.

Referring to Fig. 1, the cross-roll mill 1 illustrated in the drawings comprises a pair of oppositely disposed cross rolls 2 and 3 having their axes inclined to each other and to the line of feed of a blank between them. Disposed between the cross rolls and on opposite sides of the pass between them is a pair of adjustably mounted grooved guide rolls or disks 4 and 5 arranged on horizontal axes and adapted to be driven in any suitable manner, as through wobblers, not shown. In the pass formed between these two pairs of rolls are shown a cylindrical mandrel 6 and a tubular blank 7 thereon undergoing reduction in wall thickness and elongation by the combined actions of the rolls and guide disks.

The guide disks 4 and 5 are driven at the same speed and it is only necessary to apply the thrust measuring and indicating mechanism to one of the disks, for example, the disk 5, which is mounted in the frame 8. The guide disk 5 is mounted on a horizontal shaft 9 that is suitably splined at one end for suitable driving connections thereto. At each side of the disk 5 the shaft 9 is mounted in suitable bearings having housings 10 suitably supported on the mill frame 8.

Reference may now be had to Fig. 3 in which the details of the bearing within the right-hand bearing housing 10 are shown in enlarged detail.

The shaft 9 is provided with a series of progressively reduced portions 11, 12 and 13. The portion 11 is surrounded by a wearing sleeve 14, that is rotatable therewith. The main bearing 15 for the shaft 9 which surrounds the portion 12 is most desirably a roller bearing having rollers 16 extending parallel to the axis of the shaft 9. The rollers 16 are adapted to rotate between two spaced concentric sleeves 17 and 18 that are respectively fixed to the shaft 9 and to the stationary part of the bearing, which part comprises a sleeve 19 secured within the split housing 10.

Adjacent the shoulder between the shaft portions 12 and 13 and surrounding the latter is a thrust bearing 20 which comprises rollers 21 that are mounted for rotation about axes at right angles to that of the shaft 9 and between a flange 22 that is rotatable with the shaft 9 and a race 23 that is seated in a recess in the face of a thrust ring 25 which is non-rotatably positioned in a recess in the end of the stationary sleeve 19. The main bearing 15 and the thrust bearing 20 are mounted for limited axial movement with the shaft within the sleeve 19, the latter being provided with suitable end flanges 24 for preventing endwise movement with respect to the bearing housing 10. The sleeve 19 is also secured in any suitable manner to the housing 10 to prevent rotation of the sleeve.

The ring 25 is recessed to provide a seat for a hood 26 that is yieldingly secured to the sleeve 19 by a series of bolts 27 having relatively light coil springs 28 thereon. This arrangement provides that the shaft 9, main bearing 15, thrust bearing 20, ring 25 and hood 26 are yieldingly movable axially of the sleeve 19.

It will be noted that the lower side of the hood 26 is slotted at 29, and that a pipe 30 extends therethrough and is connected to a pipe 31 within an axial bore in the shaft 9. This arrangement is for the purpose of supplying cooling water to the guide disk 5, the details of which arrangement constitute no part of the present invention but are included in the subject matter of my copending application Serial No. 694,255, filed October 19, 1933.

The end surface 32 of the hood 26 is engaged by the end of a horizontal bar 33 which is longitudinally movable in a sleeve 34 in which the bar 33 is yieldingly pressed to the right, as viewed in Figs. 1, 3 and 4, by a spring 35. One end of the spring 35 engages a shoulder 36 on the bar 33 and the other end engages a shoulder 37 in the interior of the sleeve 34 for the purpose of biasing the bar 33 to the right.

The opposite or right end of the bar 33 engages a mechanism 39, known as a "Messinger pad", that is adapted to cause fluid pressure to be transmitted through a suitable means such as a conduit 40 having a duct 41 therein to an indicating device 42 which may be of any suitable type and provided, for example, with a pointer 43 that rotates adjacent a suitable scale 44. The pressure pad 39 and the conduit 40 are provided with a suitable fluid or semi-plastic material for transmitting pressure from the movable block 45 of the pressure pad which is engaged by the bar 33 to the indicating device 42.

The pressure pad 39 may be adjusted toward or away from the sleeve 34 by means of a mechanism comprising a hand-wheel 47, a worm gear mechanism 48, and a screw-threaded shaft 49. The spring 35 retains the bar 33 yieldingly in engagement with the pressure pad 39 in all positions of adjustment of the latter.

In the operation of the mill, the cross rolls 2 and 3 move in opposite directions to reduce the wall thickness and elongate tubular blanks, such as the blank 7, that are also engaged by the guide disks 4 and 5. The tubular blanks 7 have a helical movement in that they are rotated relatively rapidly and at the same time progress relatively slowly longitudinally. The guide disks are rotating relatively rapidly in planes that are parallel or substantially so to the line of longitudinal progression of the tubular blanks and accordingly at nearly right angles to the helical path of movement of the surfaces of the blanks.

The frictional engagement between the surface of the rotating blank and the grooved peripheries of the disks 4 and 5 causes a side thrust on each of the discs which tends to move it axially in the direction towards which the contacting surface of the blank is moving. The transverse friction between the surface of the blank and the engaging surfaces of the guide disks varies with the speed of the guide disks. It has been found that such transverse friction may be materially reduced or even virtually eliminated if the guide disks are driven at a sufficient speed relative to the speed and the feed angle of the tubular blank.

When the guide disk 5 is in engagement with the tubular blank 7 under the conditions described above, the rotation of the blank 7 in a counter-clockwise direction tends to move the guide disk 5 and the shaft 9 to the right, as viewed in Figs. 1 and 3. The shaft 9, the main bearing 15 and the thrust bearing 20, together with the ring 25, are under the thrust of the disk moved to the right against the force of the springs 28 that have an outer abutment against the heads of the bolts 27 that are secured to the stationary sleeve 19. The outward movement of the hook 26 actuates the bar 33 to the right and transmits pressure to the movable block 45 of the pressure pad 39.

The pressure pad 39 comprises a suitably packed inner chamber 51 within the block 45 which is filled with a suitable fluid or plastic substance by means of which pressure is transmitted through the duct 41 to the pressure indicating device 42. The latter indicates by means of the pointer 43 and scale 44 the pressure caused by the side thrust of the guide disk 5. In case the speed of the guide disks is adjusted to vary the transverse friction, the reading of the indicating device will vary accordingly. If the transverse friction is sufficiently diminished, the springs 28 will return the hood 26 and connected parts to the left and the pressure pad 39 will cause the bar 33 to move to the left to remain in engagement with the hood 26.

By operating the guide disks at various speeds and observing the indications of thrust at such speeds when tubes of various diameters and wall thickness and of different metals and from blanks of different diameters and wall thickness are being produced by the mill, the operator may obtain data that will enable him to operate the guide disks at the speed most suitable for the tubes that are being rolled. In some cases it will be desirable to adjust the speed of the guide disks to produce minimum transverse friction between the guide discs and the surface of the tubes. In other cases it will be desirable to vary the speed somewhat from that for producing a minimum degree of friction because of the relative wall thickness of the tubes or for other reasons. The operator is enabled however from data obtained from tests to adjust the speed in accordance with the results that are desired and the operating conditions that obtain in the mill.

In case the guide disk 5 is to be removed for replacement or repair, it is desirable to remove the bar 33 to the right in order to provide ample clearance at the right of the bearing of Fig. 3, which must be disassembled to permit the removal of the shaft 9. In order to effect the withdrawal of the bar 33, the handwheel 47 and associated mechanism is operated to move the pressure pad 39 and its connected parts to the right, as viewed in Figs. 1 and 4, whereupon the spring 35 moves the bar 33 to the right within the sleeve 34. The space between the hood 26 and sleeve 34 is then ample to permit removal of the shaft 9 and the guide disk 5.

In order to again place the parts of the thrust measuring and indicating mechanism in operating position, the handwheel 47 is operated to move the pressure pad 39 and bar 33 to the left against the compression of the spring 35 until the bar 33 again engages the hood 26 but substantially without pressure above that necessary to cause the pointer 43 to register substantially zero on the scale 44.

The reading of the indicating device 42 may indicate the actual thrust caused by the transverse friction if the device is calibrated to compensate for the force of the springs 28 which oppose the endwise movement of the disk 5 and its connected parts in response to said thrust. The reading may, if desired, be an indication of only the thrust transmitted to the indicating device in which case it will be necessary to add to the reading the force of the springs for the position of the disk 5 corresponding to the reading.

The indicating device 42 may if desired serve as a pilot or master indicator for controlling indicating devices at the various switchboards or control pulpits.

The advantages of the apparatus of my invention are that the tubes may be rolled under such conditions as either to reduce the speed of the disks and the power required to drive them in case a relatively considerable transverse friction is permissible or by increasing the power applied to the disks and therefore their speed to avoid damage to thin wall tubes by reason of frictional resistance to their rotation by the guide disks that is of greater degree than the relatively thin walls will stand without being damaged. The securing of proper operating conditions is not left to chance or guesswork, but may be adjusted in accordance with known factors of speed and transverse friction, the data for which has been obtained by observing indications at the various speeds and under various conditions, as set forth above.

The foregoing and other advantages will be apparent to those skilled in the art of constructing and operating cross-roll mills of the same general character as those shown and described herein.

I claim:

1. Cross-roll apparatus, comprising a pair of helically acting cross rolls for engaging opposite sides of a blank, a guide disk bearing on the blank between the cross rolls and rotating to move its engaging peripheral surface in the direction of longitudinal movement of the blank at a speed greater than the speed of longitudinal movement of the blank, and means for measuring the lateral thrust on said disk to thereby control the speed of said guide disk.

2. Cross-roll apparatus, comprising a pair of helically acting cross rolls for engaging opposite sides of a blank, a guide disk bearing on the blank between the cross rolls and rotating to move its engaging peripheral surface in the direction of longitudinal movement of the blank at a speed greater than the speed of longitudinal movement of the blank, and means for measuring the lateral thrust on said disc, the measuring means comprising an indicating device, and means operatively connected to said disk for transmitting thrust thereof to said indicating device.

3. Cross-roll apparatus, comprising a pair of helically acting cross rolls for engaging opposite sides of a blank, a guide disk bearing on the blank between the cross rolls and rotating to move its engaging peripheral surface in the direction of longitudinal movement of the blank at a speed greater than the speed of longitudinal movement of the blank, and means for measuring the lateral thrust on said disk for determining the transverse friction between said disc and the surfaces of the rotating blank, the measuring means comprising a pressure indicating device, a movable thrust bearing for said disk, and means for operatively connecting said bearing and said indicating device.

4. Cross-roll apparatus, comprising a pair of helically acting cross rolls for engaging opposite sides of a blank, a pair of guide disks bearing on said blank between the cross rolls and rotating to move their engaging peripheral surfaces in the direction of longitudinal movement of the blank at a speed greater than the speed of longitudinal movement of the blank, a supporting shaft for each of said disks, a movable bearing for one of said shafts, and an indicating device connected to said bearing for indicating the relative degree of transverse friction between the engaging surfaces of the rotating blank and of the disk having the bearing.

5. Cross-roll apparatus, comprising a pair of helically acting cross rolls for engaging opposite sides of a blank, a pair of guide disks bearing on said blank between the cross rolls and rotating to move their engaging peripheral surfaces in the direction of longitudinal movement of the blank at a speed greater than the speed of longitudinal movement of the blank, a supporting shaft for each of said disks, an axially movable thrust bearing for one of said shafts, and an indicating device responsive to the forces exerted upon said thrust bearing to thereby measure the transverse friction between the engaging surfaces of the corresponding disk and of the blank.

6. Cross-roll apparatus, comprising a pair of helically acting cross rolls for engaging opposite sides of a blank, a pair of guide disks bearing on said blank between the cross rolls and rotating to move their engaging peripheral surfaces in the direction of longitudinal movement of the blank at a speed greater than the speed of longitudinal movement of the blank, a supporting shaft for each of said disks, an axially movable thrust bearing for one of said shafts, a pressure responsive indicating device, and means comprising a bar movable with said thrust bearing for actuating said indicating device.

7. Cross-roll apparatus, comprising a pair of helically acting cross rolls for engaging opposite sides of a blank, a pair of guide disks bearing on said blank between the cross rolls and rotating to move their engaging peripheral surfaces in the direction of longitudinal movement of the blank at a speed greater than the speed of longitudinal movement of the blank, a supporting shaft for each of said disks, an axially movable thrust bearing for one of said shafts, a member secured to a non-rotatable portion of said bearing, a bar held against said member, and a pressure responsive indicating device actuated by said bar.

8. Cross-roll apparatus, comprising a pair of helically acting cross rolls for engaging opposite sides of a blank, a guide disk bearing on the blank between the cross rolls and rotating to move its engaging peripheral surface in the direction of longitudinal movement of the blank at a speed greater than the speed of longitudinal movement of the blank, and means for measuring the lateral thrust on said disk for determining the transverse friction between said disk and the surface of the rotating blank, the measuring means comprising a thrust bearing for said disk having limited axial movement, an indicating device responsive to said axial movement, and means for moving said indicating device into and out of operative connection to said thrust bearing.

9. Cross-roll apparatus, comprising a pair of helically acting cross rolls for engaging opposite sides of a blank, a guide disk bearing on the blank between the cross rolls and rotating to move its engaging peripheral surface in the direction of longitudinal movement of the blank at a speed greater than the speed of longitudinal movement of the blank, and means for measuring the lateral thrust on said disk for determining the transverse friction between said disk and the surface of the rotating blank, the measuring means comprising a thrust bearing for said disk having limited axial movement, an indicating device responsive to said axial movement, a movable horizontal bar for operatively connecting said bearing and said indicating device, means for moving said indicating device longitudinally of said bar, and a spring for maintaining said bar in engagement with said indicating device.

SAMUEL E. DIESCHER.